United States Patent
Kashiwakura

(10) Patent No.: US 8,108,163 B2
(45) Date of Patent: Jan. 31, 2012

(54) POWER SUPPLY NOISE ANALYSIS METHOD, APPARATUS AND PROGRAM FOR ELECTRONIC CIRCUIT BOARD

(75) Inventor: Kazuhiro Kashiwakura, Tokyo (JP)

(73) Assignee: NEC Corporation, Tokyo (JP)

( * ) Notice: Subject to any disclaimer, the term of this patent is extended or adjusted under 35 U.S.C. 154(b) by 373 days.

(21) Appl. No.: 12/401,065

(22) Filed: Mar. 10, 2009

(65) Prior Publication Data

US 2009/0234602 A1    Sep. 17, 2009

(30) Foreign Application Priority Data

Mar. 11, 2008    (JP) .................. 2008-061590

(51) Int. Cl.
*G01R 25/00*    (2006.01)
*G01R 27/00*    (2006.01)
*G06F 17/50*    (2006.01)

(52) U.S. Cl. ............. 702/65; 702/191; 703/14; 716/115

(58) Field of Classification Search .................... 702/65, 702/191

See application file for complete search history.

(56) References Cited

U.S. PATENT DOCUMENTS

2007/0085193 A1*   4/2007   Kashiwakura ............... 257/698
2008/0002373 A1*   1/2008   Arai et al. .................... 361/737

FOREIGN PATENT DOCUMENTS

JP    2005031850 A    2/2005
JP    2005251223 A    9/2005

OTHER PUBLICATIONS

Hideki et al., JP2005-251223 (machine translation).*
Muneaki, JP2005-031850 (machine translation).*
Bazes, Output buffer impedance control and noise reduction using a speed-locked loop, Solid State Circuits Conference 2004—Digest of Technical Papers, Feb. 2004, Volumn 1, pp. 486-541.*

* cited by examiner

Primary Examiner — Eliseo Ramos Feliciano
Assistant Examiner — L. Anderson

(57) ABSTRACT

Disclosed is a method including: calculating power supply input impedance of the LSI from the number of output buffers of the LSI, output impedance of an output buffer, signal characteristic impedance and characteristic impedance of power supply/ground of an LSI terminal, a package, and a chip terminal part, characteristic impedance of wiring connected to an LSI output terminal, and output signal damping resistance calculating a reflected voltage of power supply noise at a semiconductor device mounted on an electronic circuit board, based on impedance characteristic between a power supply and ground of the semiconductor device; and analyzing power supply noise of the electronic circuit board, based on the reflected voltage of the power supply noise at the semiconductor device.

2 Claims, 16 Drawing Sheets

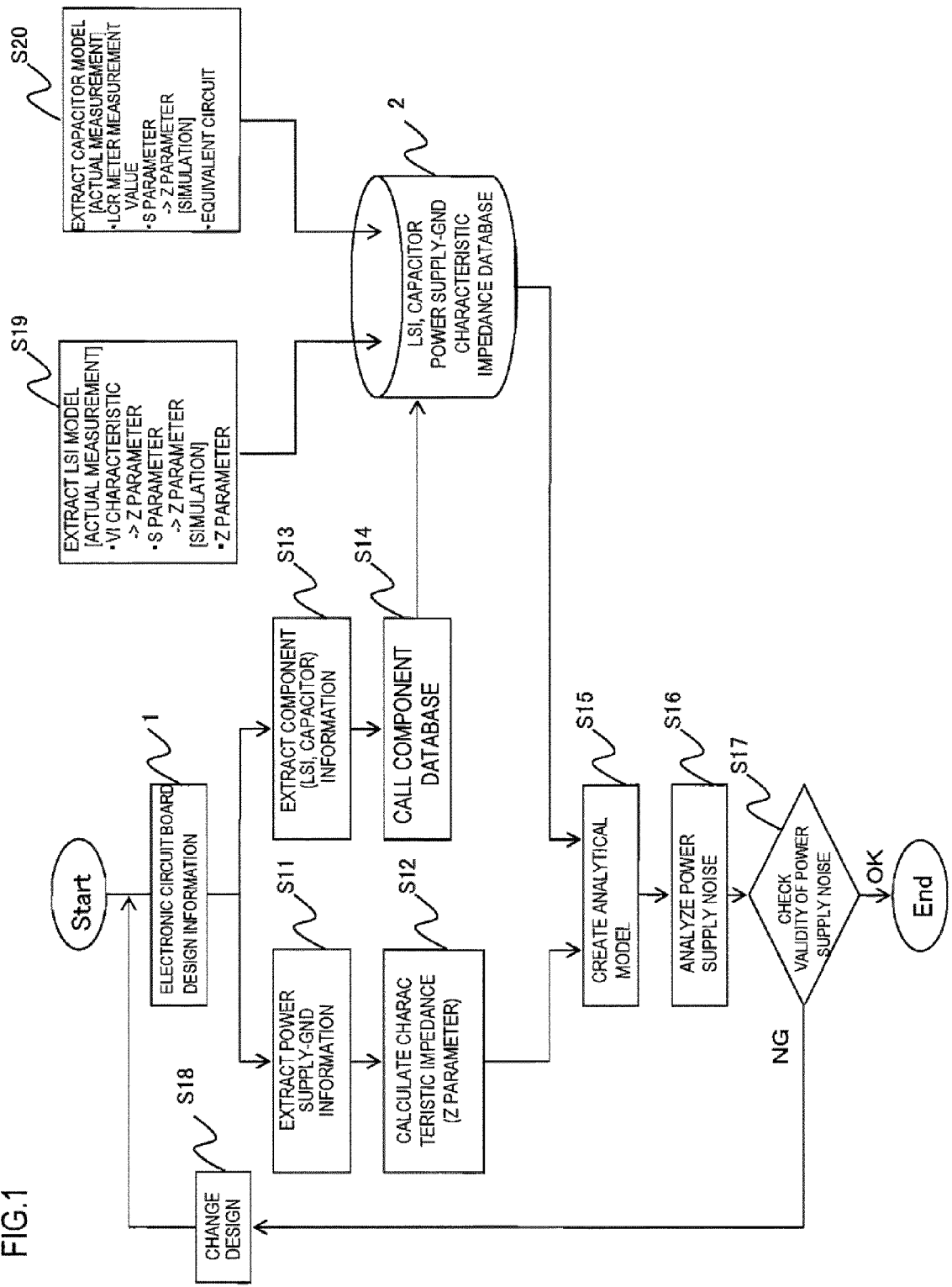

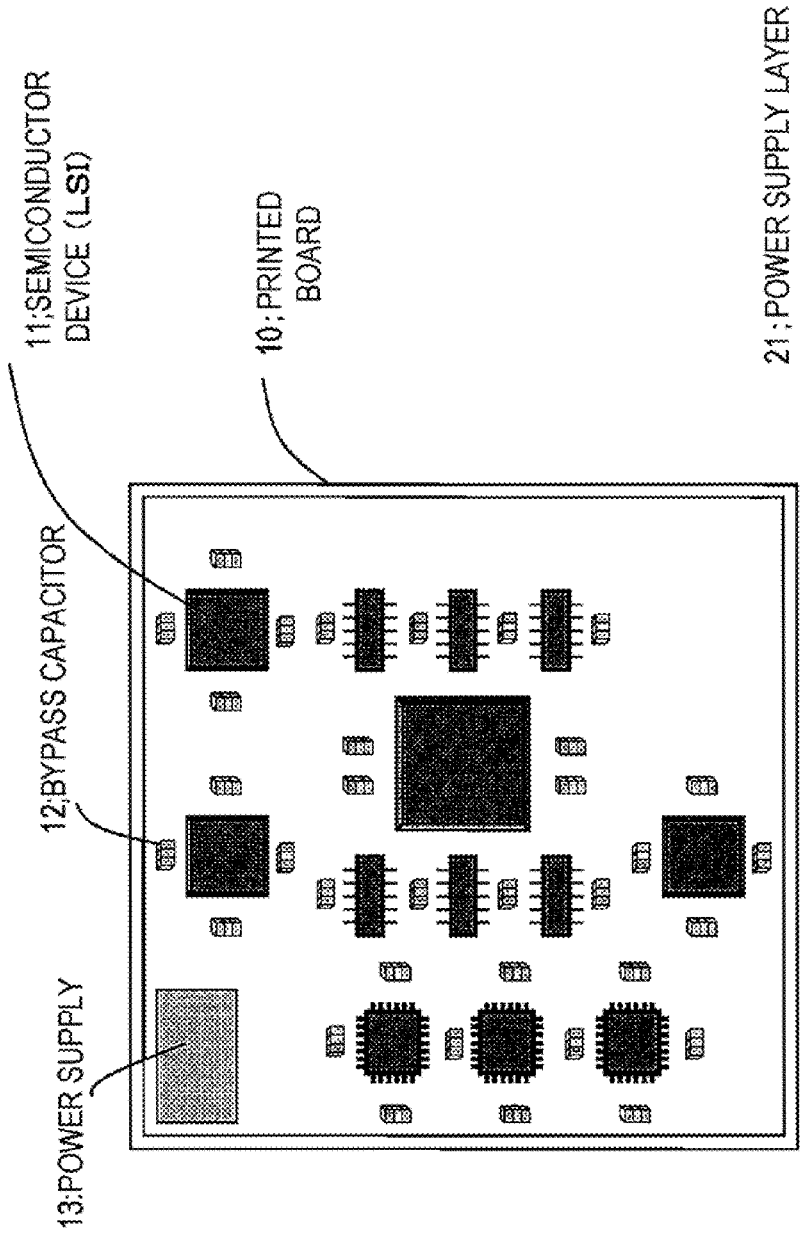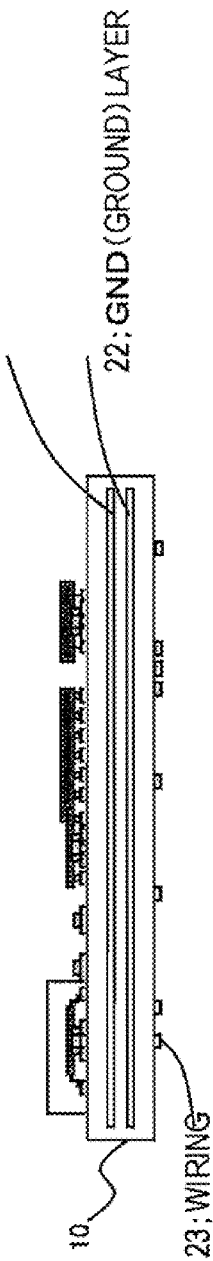
FIG.2A
FIG.2B

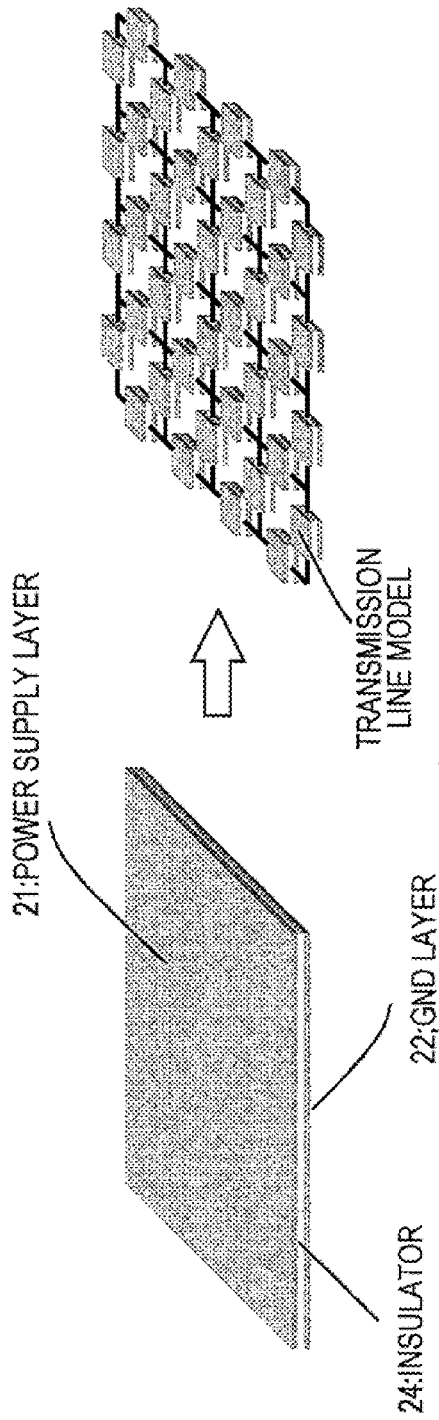
FIG.3A
FIG.3B
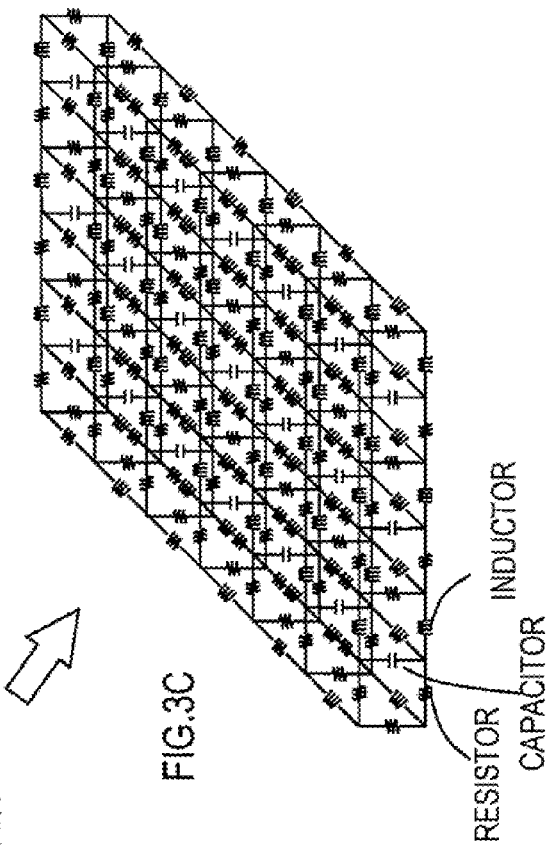
FIG.3C

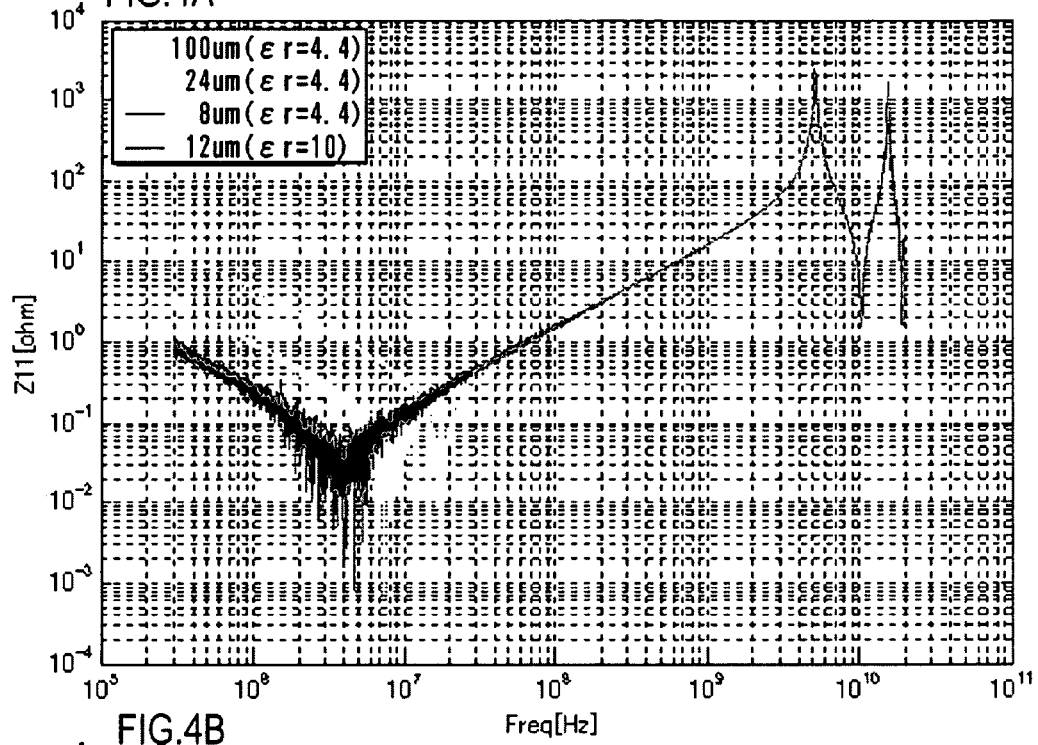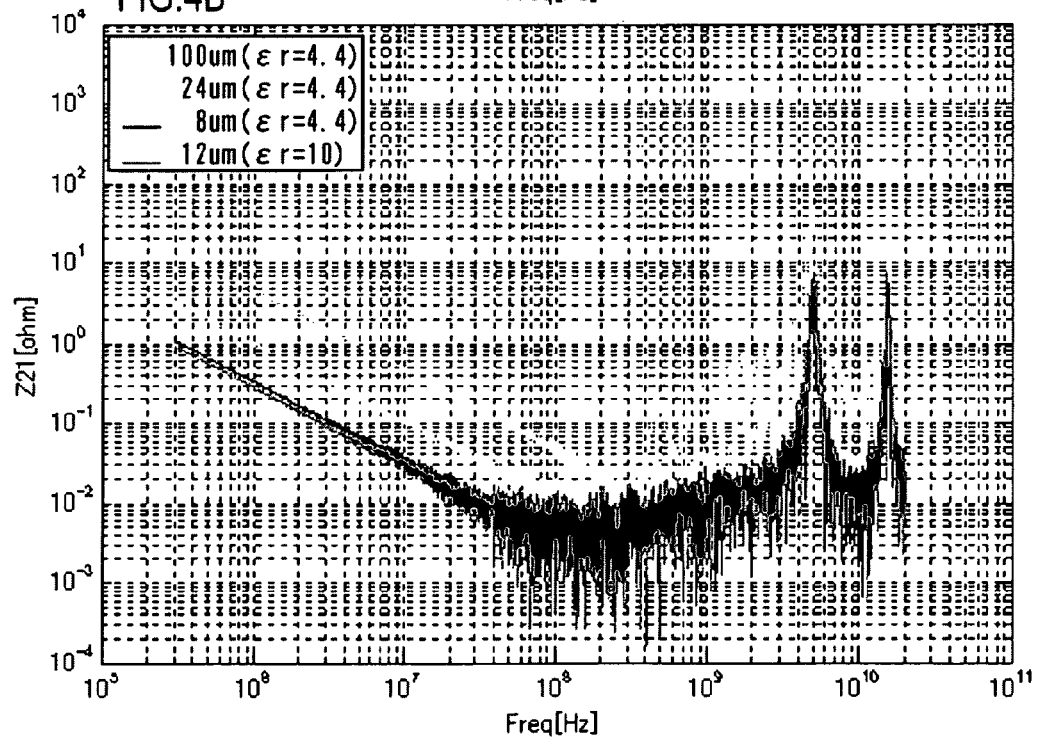

CAPACITOR IMPEDANCE CHARACTERISTIC

CAPACITOR EQUIVALENT CIRCUIT

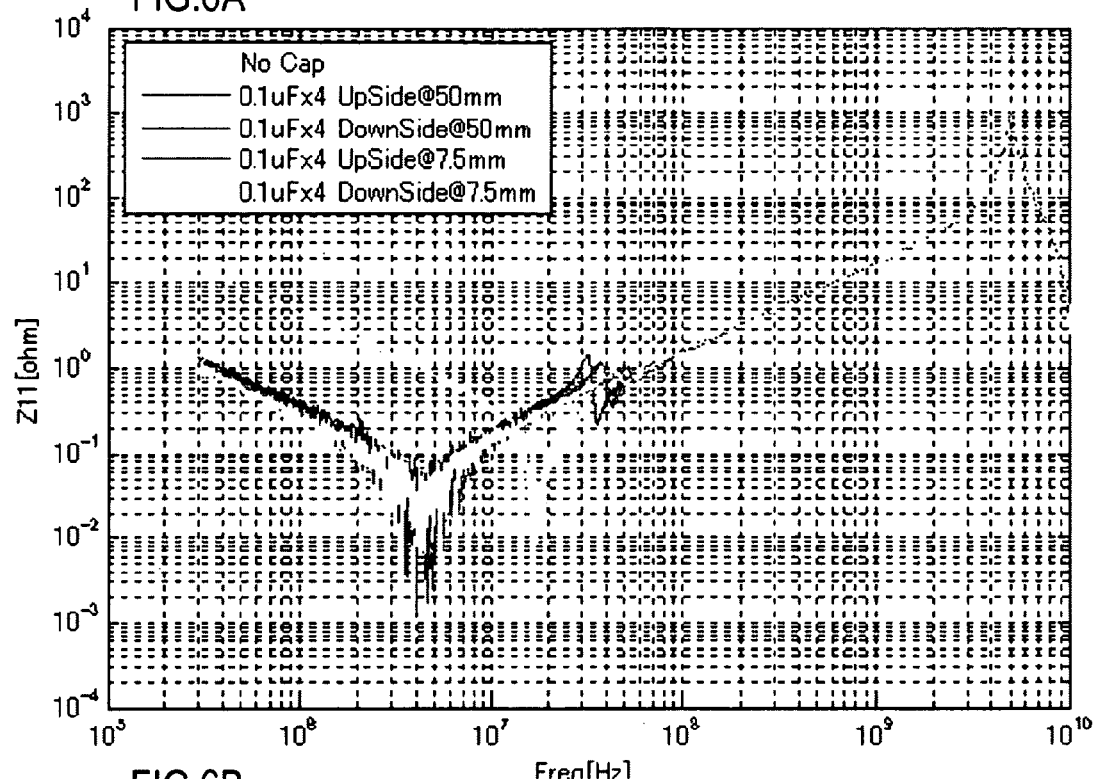
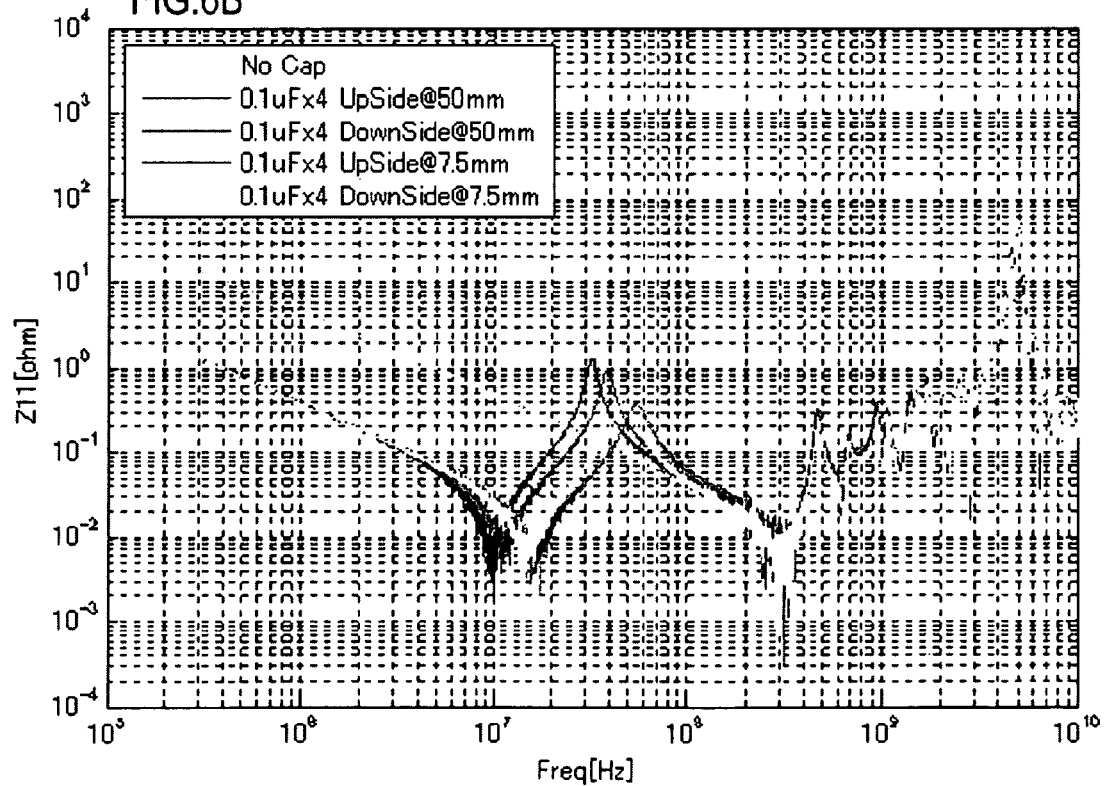

OUTPUT IMPEDANCE $= \dfrac{R_{on}(PMOS) \times R_{on}(NMOS)}{R_{on}(PMOS) + R_{on}(NMOS)}$

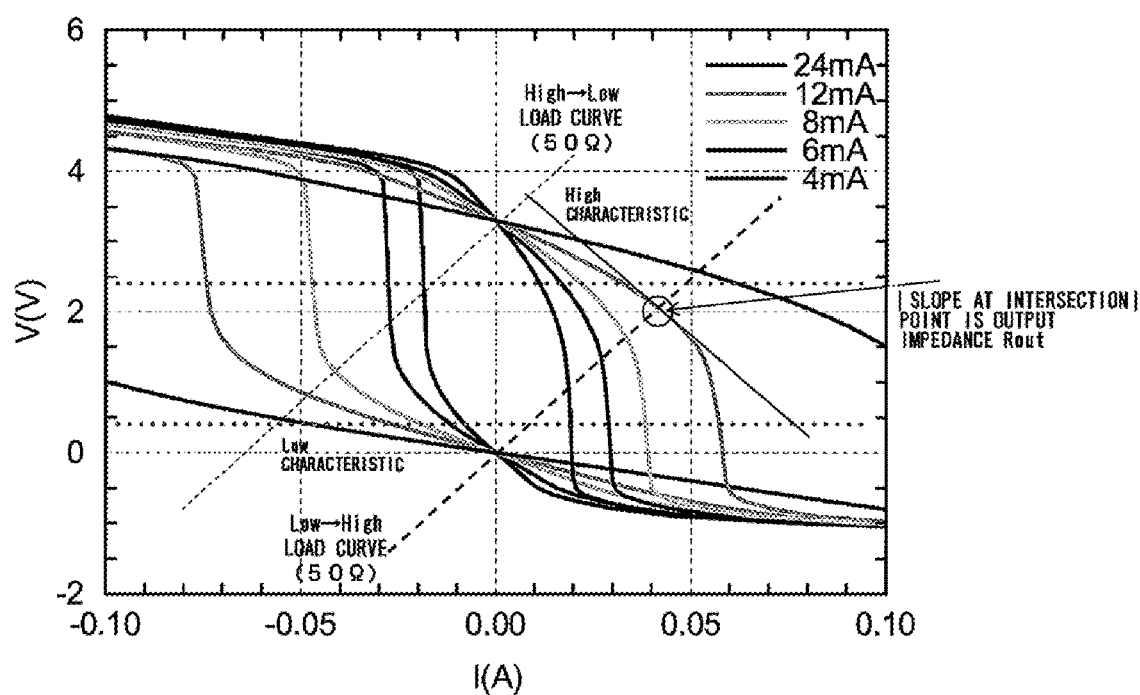

POWER SUPPLY NOISE ANALYSIS METHOD, APPARATUS AND PROGRAM FOR ELECTRONIC CIRCUIT BOARD

REFERENCE TO RELATED APPLICATION

This application is based upon and claims the benefit of the priority of Japanese patent application No. 2008-61590, filed on Mar. 11, 2008, the disclosure of which is incorporated herein in its entirety by reference thereto.

TECHNICAL FIELD

This invention relates to a technique for analyzing power supply noise. More particularly, the invention relates to a method, system and program suited to application to analysis of power supply noise in an electronic circuit board.

BACKGROUND ART

Semiconductor electronic components such as chips produced by LSI (Large-Scale Integrated circuit) mounted on electronic circuit boards have undergone advancements in terms of higher signal speed and lower power supply voltage. This means that power supply noise has an influence upon stable operation and quality of the electronic circuit. Specifically, the suppression of power supply noise, referred to as "power integrity (PI)" is essential in the design of an electronic circuit.

In the design phase of an electronic circuit board (referred to also as a "printed board" or "printed circuit board" below), various proposals have been made heretofore with regard to methods of suppressing and analyzing power supply noise. For example, Patent Document 1 discloses a method of evaluating the characteristics of a printed circuit board wherein whether design of a printed circuit board that suppresses variations in power supply voltage and prevents an unwanted electromagnetic emission due to resonance of the power supply circuitry could be achieved is evaluated, during or after creation of a board layout prior to manufacturing of the board. The method includes the steps of:

calculating the impedance characteristic of the power supply circuitry within the board as seen from the power supply-terminal connection position of each active element mounted on the printed circuit board;

calculating the impedance characteristic from the power supply-terminal connection position to a capacitor element connected at a position nearest to this connection position; and determining whether resonance will occur within the power supply circuitry by comparing any among the sizes, phases, real parts or imaginary parts of the impedance characteristic of the power supply circuitry and of the impedance characteristic up to the capacitor element.

This method extracts impedance from power supply-ground design information, calculates resonance of the board and evaluates the validity of the design. However, it does not analyze power supply noise taking the characteristic of a LSI-chip into consideration. That is, the method does not analyze power supply noise that propagates along the printed circuit board from the LSI chip.

Patent Document 2 discloses a power supply noise analysis method as a method that takes into account power supply noise that propagates along a printed circuit board from an LSI chip. This method makes it possible to analyze power supply noise within a semiconductor integrated circuit taking the effect of a printed board into account and to analyze power supply noise on the printed board generated by the semiconductor integrated circuit. This method includes the steps of:

dividing the semiconductor integrated circuit into a plurality of first unit areas;

expressing a power line, circuit and circuit current consumption of each first unit area by a simplified power supply network, capacitance and current source;

obtaining a model of the overall semiconductor integrated circuit by compiling the power supply networks, capacitances and current sources with regard to the plurality of first unit areas; dividing the printed board on which the semiconductor integrated circuit is mounted into a plurality of second unit areas;

expressing the power supply layer of each second unit area by a power supply network and capacitance;

obtaining a model of the overall printed board by compiling the power supply networks regarding the plurality of second unit areas; and solving a circuit equation by combining the model of the overall semiconductor integrated circuit and the model of the overall printed board.

In accordance with this method of analyzing power supply noise, the power supply is analyzed by combining the model for analyzing power supply noise of the semiconductor integrated circuit and the model for analyzing power supply noise of the printed board. As a result, with regard to the semiconductor integrated circuit of interest, the influence of power supply noise generated by another semiconductor integrated circuit on the printed board can be taken into consideration and it is possible to analyze power supply noise that is generated by the semiconductor integrated circuit and propagates along the printed board.

[Patent Document 1] Japanese Patent Kokai Publication No. 2005-251223A

[Patent Document 2] Japanese Patent Kokai Publication No. 2005-31850

The entire disclosures in the above-mentioned Patent Documents and Non-Patent Document are incorporated herein by reference thereto. The analysis of the related art will be given by the present invention in the below.

The invention disclosed in Patent Document 1 relies solely upon the characteristics of a printed board and bypass capacitor and does not take into account the behavior of the LSI chip that is the source of noise. As a result, even if the amount of noise produced by the LSI chip is small, measures for dealing with the power supply noise are taken as an inevitable consequence and there are instances where this leads to excessive quality, i.e., an increase in cost.

An increase in the speed of a semiconductor device causes an increase in power supply noise, and a reduction in voltage causes a reduction in the immunity to power supply noise. This makes it difficult to design the printed board.

Thus, although it has become essential to suppress power supply noise in a printed board, Patent Document 1 does not clearly set forth a method of precisely analyzing power supply noise.

On the other hand, the invention disclosed in Patent Document 2 makes it possible to take into account the influence of power supply noise generated by another semiconductor integrated circuit on a printed board and to analyze power supply noise that is generated by a semiconductor integrated circuit and propagates along the printed board. However, the invention of Patent Document 2 solves a circuit equation by combining models of the overall semiconductor integrated circuits and the model of the overall printed board. As will be discussed later, the present invention is entirely different.

SUMMARY

Accordingly, an object of the present invention is to provide a method, system and program that make it possible to analyze power supply noise produced in an electronic circuit board by a semiconductor device.

According to present invention, which seeks to solve one or more of the above problems there are provided a method, system, program described below.

According to one aspect of the present invention, there is provided a method comprising:

calculating a reflected voltage of power supply noise at a semiconductor device mounted on an electronic circuit board, based on an impedance characteristic between a power supply and ground of the semiconductor device; and analyzing power supply noise of the electronic circuit board, based on the reflected voltage of the power supply noise at the semiconductor device.

According to another aspect of the present invention, there is provided an apparatus comprising:

a section that calculates a reflected voltage of power supply noise at a semiconductor device mounted on the electronic circuit board, based on an impedance characteristic between a power supply and ground of the semiconductor device; and a section that analyzes the power supply noise of the electronic circuit board, based on the reflected voltage of power supply noise at a semiconductor device.

According to another aspect of the present invention, there is provided a program for causing a computer to execute the following processing, comprising:

calculating a reflected voltage of power supply noise at a semiconductor device mounted on an electronic circuit board, based on an impedance characteristic between a power supply and ground of the semiconductor device; and analyzing power supply noise of the electronic circuit board, based on the reflected voltage of the power supply noise at the semiconductor device.

According to still another aspect of the present invention, there is provided a computer readable recording medium storing a program for causing a computer to execute the following processing, comprising:

calculating a reflected voltage of power supply noise at a semiconductor device mounted on an electronic circuit board, based on an impedance characteristic between a power supply and ground of the semiconductor device; and analyzing power supply noise of the electronic circuit board, based on the reflected voltage of the power supply noise at the semiconductor device.

In the present invention, power supply noise is estimated from characteristic impedance between power supply and ground (GND) of a printed board, and input impedance between power supply and ground of an LSI, and estimate noise amount at which an electronic circuit can stably operate. In the present invention, the input impedance between the power supply and ground of the LSI may be derived from the number of output signals from the LSI (number of simultaneous operations) and from drive capability thereof.

According to the present invention, by obtaining the impedance between the power supply and ground of a semiconductor device, and analyzing the power supply noise of the electronic circuit board, stable operation of the electronic circuit is made possible.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 1 is a diagram useful in describing processing according to an exemplary embodiment of the present invention;

FIGS. 2A and 2B are diagrams useful in describing an example of the configuration of an electronic circuit board (printed board);

FIGS. 3A, 3B and 3C are diagrams useful in describing models of a power supply—ground plane;

FIGS. 4A and 4B are diagrams illustrating power supply—ground impedance characteristics;

FIGS. 6A and 6B illustrate impedance characteristics obtained by placing a capacitor on an electronic circuit board;

FIG. 14 is a diagram describing derivation of output impedance of the CMOS output buffer;

PREFERRED MODES

Figure 5B:
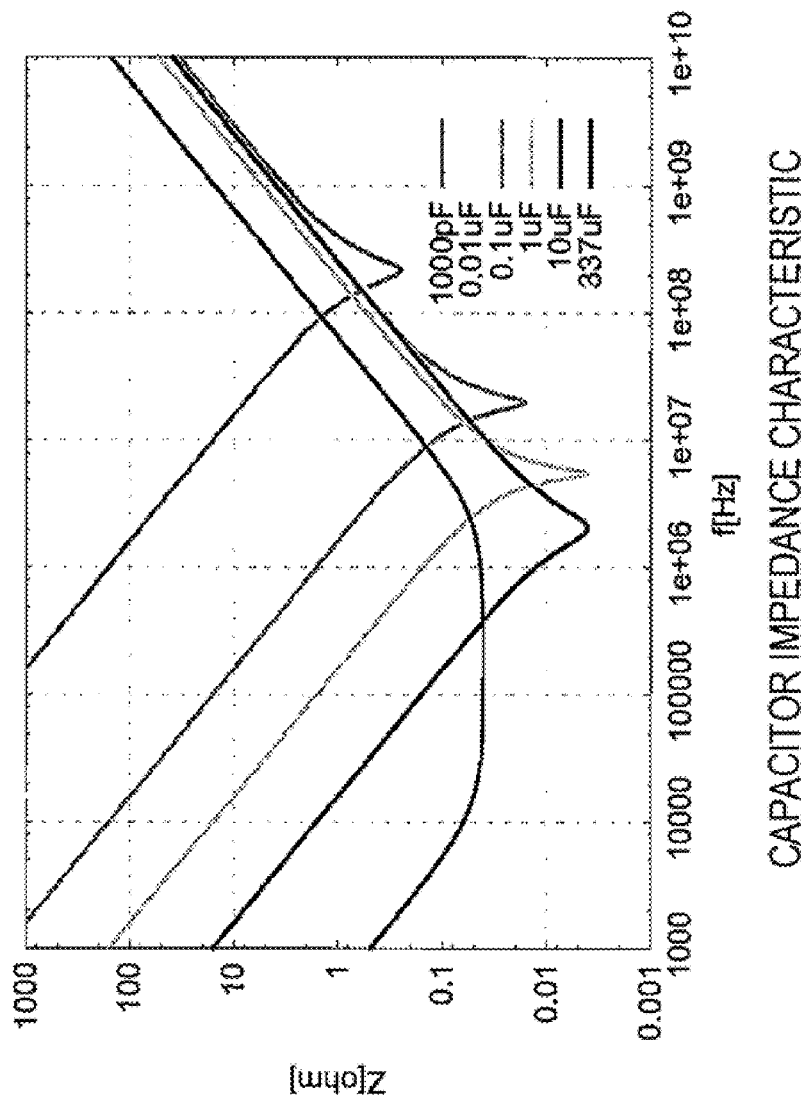
FIGS. 5A and 5B are diagrams illustrating an equivalent circuit and impedance characteristic of a capacitor.

The present invention calculates a reflected voltage of power supply noise at a semiconductor device (LSI), based on impedance characteristic between a power supply and ground of the semiconductor device (LSI) mounted on an electronic circuit board, and analyzes power supply noise of the electronic circuit board. In the present invention, the power supply noise that flows to the electronic circuit board from the semiconductor device (LSI), is obtained based on the reflected voltage at the semiconductor device (LSI); and with regard to a plurality of semiconductor devices (LSIs) mounted on the electronic circuit board, based on a principle of superposition, the power supply noise of the whole of the electronic circuit board is computed from the sum of the power supply noise flowing from the semiconductor device to the electronic circuit board (LSI).

In one embodiment of the present invention, the input impedance between the power supply and ground of the semiconductor device, may be derived based on number of output signals of the semiconductor device (LSI) and drive capability thereof.

In the present invention, reference is done to design information of the semiconductor device (LSI) mounted on the electronic circuit board, stored in a recording medium; and the input impedance between the power supply and ground of the semiconductor device (LSI), is derived based on the number of output buffers in the semiconductor device (LSI), an output impedance of the output buffer, a characteristic impedance between power supply and ground, and signal characteristic impedance of each of a semiconductor device terminal part, a semiconductor device package part, and a chip terminal part, a characteristic impedance of wiring connected to an output terminal of the semiconductor device (LSI), and a damping resistance of an output signal.

In the present invention, assuming that the following holds:

the number of output buffers in the semiconductor device (LSI) is n, an output impedance of the output buffer of the semiconductor device (LSI) is Rout, a characteristic impedance between the power supply and ground and that of signal of a terminal part of the semiconductor device (LSI) are Zvterm and Zsterm, respectively, a characteristic impedance between the power supply and ground and that of signal of a package part of the semiconductor device (LSI) are Zvpkg and Zspkg, respectively, a characteristic impedance between the power supply and ground and that of signal of a chip terminal part are Zvbump and Zsbump, respectively, a characteristic impedance of a wiring pattern connected to a terminal of the output buffer of the semiconductor device (LSI) is Z0, and a resistance value of a damping resistor is Rs, if the damping resistor is mounted on the wiring pattern, and the input impedance between the power supply and ground of the semiconductor device (LSI) $Z1si$ may be calculated by $Z1si=Zvterm+Zvpkg+Zvbump+\{Rout+Zsbump+Zspkg+Zsterm+Rs+Z0\}/n$.

In the present invention, assuming that the following holds:

the number of output buffers in the semiconductor device (LSI) is n, an output impedance of the output buffer of the semiconductor device (LSI) is Rout, a characteristic impedance of a wiring pattern connected to a terminal of an output buffer of the semiconductor device is Z0, a resistance value of a damping resistor is Rs if the damping resistor is mounted on the wiring pattern, and the input impedance between the power supply and ground of the semiconductor device (LSI) $Z1si$ may be calculated by $$Z1si=\{Rout+Rs+Z0\}/n.$$

In the present invention, reference may be done to design information of the semiconductor device (LSI) mounted on the electronic circuit board, stored in a recording medium, and the input impedance between the power supply and ground of the semiconductor device (LSI), may be derived based on number of internal gates of the semiconductor device (LSI), output impedance, characteristic impedance between power supply and ground of each of a semiconductor device terminal, a package, and a chip terminal part, and characteristic impedance of wiring in a chip. In the present invention, assuming that the following holds:

the number of internal gates in the semiconductor device (LSI) is n; the output impedance is Rout;

the characteristic impedances between power supply and ground of the semiconductor device terminal part, package part, and the chip terminal part, are Zvterm, Zvpkg, and Zvump, respectively, the characteristic impedance of the wiring in the chip is Zschip;

the input impedance between the power supply and ground of the semiconductor device $Z1si$ may be calculated by $$Z1si=Zvterm+Zvpkg+Zvbump+(Rout+Zschip)/n.$$

In the present invention, power supply noise flowing from the semiconductor device (LSI) to the electronic circuit board, may be calculated based on the reflected voltage at the semiconductor device (LSI); and power supply noise of the overall electronic circuit board may be derived by summing the power supply noise flowing to the electronic circuit board from a plurality of semiconductor devices (LSIs) mounted on the electronic circuit board, based on a principle of superposition.

In the invention, an amount of power supply noise of the semiconductor devices and a predetermined amount of immunity to power supply noise, may be compared to check whether or not the design of the electronic circuit board is valid.

In the present invention, a circuit board model in which a power supply layer of the electronic circuit board is modeled by a two dimensional transmission line may be employed.

In the present invention, a model of an impedance characteristic of an electronic component mounted on the electronic circuit board, may be obtained from a database in which the model of the impedance characteristic of the electronic component is recorded, and the model of the impedance characteristic of the electronic component mounted on the electronic circuit board may be utilized to configure a model for power supply noise analysis of the electronic circuit board.

In the present invention, use is made of a model that regards power supply noise as being ascribable to switching operation of the semiconductor device (LSI).

In the present invention, power supply and ground information and electronic components inclusive of at least a capacitor and the semiconductor device (LSI) connected to the power supply and ground are extracted from design information of the electronic circuit board;

an analytical model of power supply noise is created by connecting a model of the impedance characteristic of the extracted electronic component to a mounting position on a board model of the electronic circuit board;

propagation of power supply noise flowing from the semiconductor device (LSI) to the electronic circuit board is calculated in the analytical model of power supply noise; and behavior of propagation of power supply noise in the electronic circuit board, is analyzed based on each power supply noise of the semiconductor devices (LSIs) mounted on the electronic circuit board.

In the present invention, it is assumed that n (where n is a prescribed positive integer) of the semiconductor devices are mounted on the electronic circuit board;

power supply noise is treated as noise ascribable to switching operation of the semiconductor device;

relating to an ith (where i=1 to n holds) semiconductor device, it is assumed that the following holds:

an input impedance characteristic is $Z1si[i]$;

a reflected impedance characteristic as seen from the position at which the ith semiconductor device is mounted is Z11[i], this characteristic being the result of removing the ith semiconductor device from the overall electronic circuit board, at the mounting position of the ith semiconductor device on the electronic circuit board, power supply voltage VCC is applied as maximum voltage and VCC·x Z11[i]/(Z11[i]+Z1$si$[i]) is applied as minimum voltage; and noise Vamp[i]=VCC−VCC×Z1$si$[i]/(Z11[i]+Z1$si$[i]) the amplitude of which is the difference between these maximum and minimum voltages, flows from the electronic circuit board into the ith semiconductor device.

Under the above-described conditions, the noise Vn[i] that flows from the ith semiconductor device to the electronic circuit board is calculated according to the following from an equation of reflection:

$$Vn[i] = Vamp[i] \cdot x(Z1si[i] - Z11[i])/(Z1si[i] + Z11[i])$$

and with regard to the n semiconductor devices, the sum of noise Vn[i] (i=1 to n) that flows from the semiconductor device to the electronic circuit board is obtained to analyze power supply noise of the overall electronic circuit board. Exemplary embodiments of the present invention will now be described with reference to drawings.

FIG. 1 is a diagram useful in describing the operating principle (configuration and processing flow) of an exemplary embodiment of the present invention. The system (power supply noise analyzing system) having the configuration shown in FIG. 1 can be implemented by a data processing apparatus having a calculating unit, a storage unit, an input/output unit and, when necessary, a communication unit, etc. Further, it may be so arranged that all or some of the processing and functions of each of the steps in FIG. 1 is implemented by a program executed by the data processing apparatus. The program may be stored in a computer readable medium.

First, design information relating to power supply and ground is extracted from design information 1 relating to an electronic circuit board, the power supply noise of which is to be analyzed (step S11).

As shown for example in FIG. 2A, the electronic circuit board has a semiconductor device (LSI chip) 11 and electronic components such as a capacitor (bypass capacitor) 12 mounted on a printed board 10.

In general, as shown for example in FIG. 2B, a multilayer printed board has a power supply layer (power wiring layer) 21 and a ground layer (ground wiring layer) 22 sandwiching an insulating resin constituting the printed board 10. Power is supplied from a power supply 13 to the LSI chip 11 through these layers. The electronic circuit design information 1 includes electronic circuit board information, component information relating to the mounted electronic components and connection information, and this information is stored in a prescribed storage unit (storage area).

At step S11 in FIG. 1, physical information and circuit information connected to the power supply and ground is extracted from the electronic circuit design information 1.

Next, power supply and ground planes in FIG. 3A are approximated (modeled) by a transmission line model as shown in FIG. 3B or by a mesh structure of resistors, capacitors and inductors, etc., as shown in FIG. 3C. FIG. 3C is a diagram illustrating an example in which the two-dimensional transmission line model of FIG. 3B is modeled using inductors (L), capacitors (C) and resistors (R).

Next, at step S12 in FIG. 1, the power supply-to-ground impedance characteristic (Z parameter) is calculated. Examples of impedance calculation are illustrated in FIGS. 4A and 4B. FIG. 4A illustrates reflected impedance (Z11) [ohm] (logarithmic scale) at a certain position, and FIG. 4B illustrates transmitted impedance (Z21) [ohm] (logarithmic scale) from a certain position to a certain position. In FIGS. 4A and 4B, ∈r at "100 μm (∈r=4.4)" represents the relative permittivity (dielectric constant) of the insulator (dielectric) in a parallel-plate capacitor [e.g., a capacitor comprising the parallel plates of the power supply layer 21 and ground layer 22 and an insulator 24 between these plates in FIG. 3A]. The figure of 100 μm is the film thickness of the insulator (dielectric).

At step S13 in FIG. 1, electronic components connected to the power supply and ground are extracted from the electronic circuit design information 1. The electronic components extracted at step S13 are a capacitor used as a bypass capacitor and a semiconductor device (LSI chip).

Figure 5A:
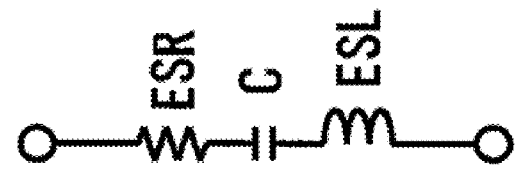

As illustrated in FIG. 5A, the capacitor is not a pure capacitance but is indicated by a series circuit composed of a capacitor (C), an ESR (Equivalent Series Resistance) and an ESL (Equivalent Series Inductance). The impedance characteristic (logarithmic scale) of the capacitor is illustrated in FIG. 5B. The horizontal axis is a plot of frequency (logarithmic scale). The model of the capacitor may be adapted so as to obtain the impedance characteristic by a method of calculating the power supply-to-ground impedance (Z parameter) from actual measurement (a value measured by an LCR meter) or by measuring an S parameter S11 and converting this to the Z parameter. Alternatively, the impedance characteristic may be found from a simulation. The power supply-to-ground impedance of the capacitor is stored in a component database 2 beforehand as electronic component information (step S20 in FIG. 1).

At step S14 in FIG. 1, with regard to an electronic component (electronic component information) extracted from the electronic circuit design information 1, the impedance characteristic of the electronic component is read out of the component database 2 and the electronic component is connected to the mounting position on the board model shown in FIGS. 3A to 3C. Further, at step S14, with regard also to the LSI chip, the characteristic (impedance characteristic) similarly is read out of the component database 2 and the LSI chip is connected to the mounting position on the board model shown in FIGS. 3A to 3C.

The model of an LSI chip is such that the impedance characteristic can be obtained by a method of driving the actual device and calculating the power supply-to-ground impedance (Z parameter) from the supply voltage and supply current (VI characteristic), or by measuring a return loss (S parameter S11) and converting this to the Z parameter. Alternatively, if the model is a semiconductor model (SPICE model, etc.), then the impedance characteristic is obtained in similar fashion from a simulation. The impedance characteristic of the LSI also is stored in the component database 2 beforehand (S19 in FIG. 1).

FIGS. 6A and 6B are impedance characteristics obtained by placing a capacitor on an electronic circuit board (printed board), in which FIG. 6A illustrates reflected impedance and FIG. 6B transmitted impedance. These illustrate that mounting a capacitor on a printed board causes a change in the impedance characteristic of the overall board. They illustrate that even if the capacitor has the same capacitance, the characteristic itself changes if the mounting position is changed.

In FIGS. 6A and 6B, "No Cap" represents absence of a capacitor; "0.1 μF×4 UpSide@50 mm" represents a case where four capacitors of capacitance 0.1 μF are laid out spaced away from one another by 50 mm on the componentsurface side; and "0.1 μF×4 DownSide@50 mm" represents a case where four capacitors of capacitance 0.1 μF are laid out spaced away from one another by 50 mm on the solder-surface side.

Figure 7:
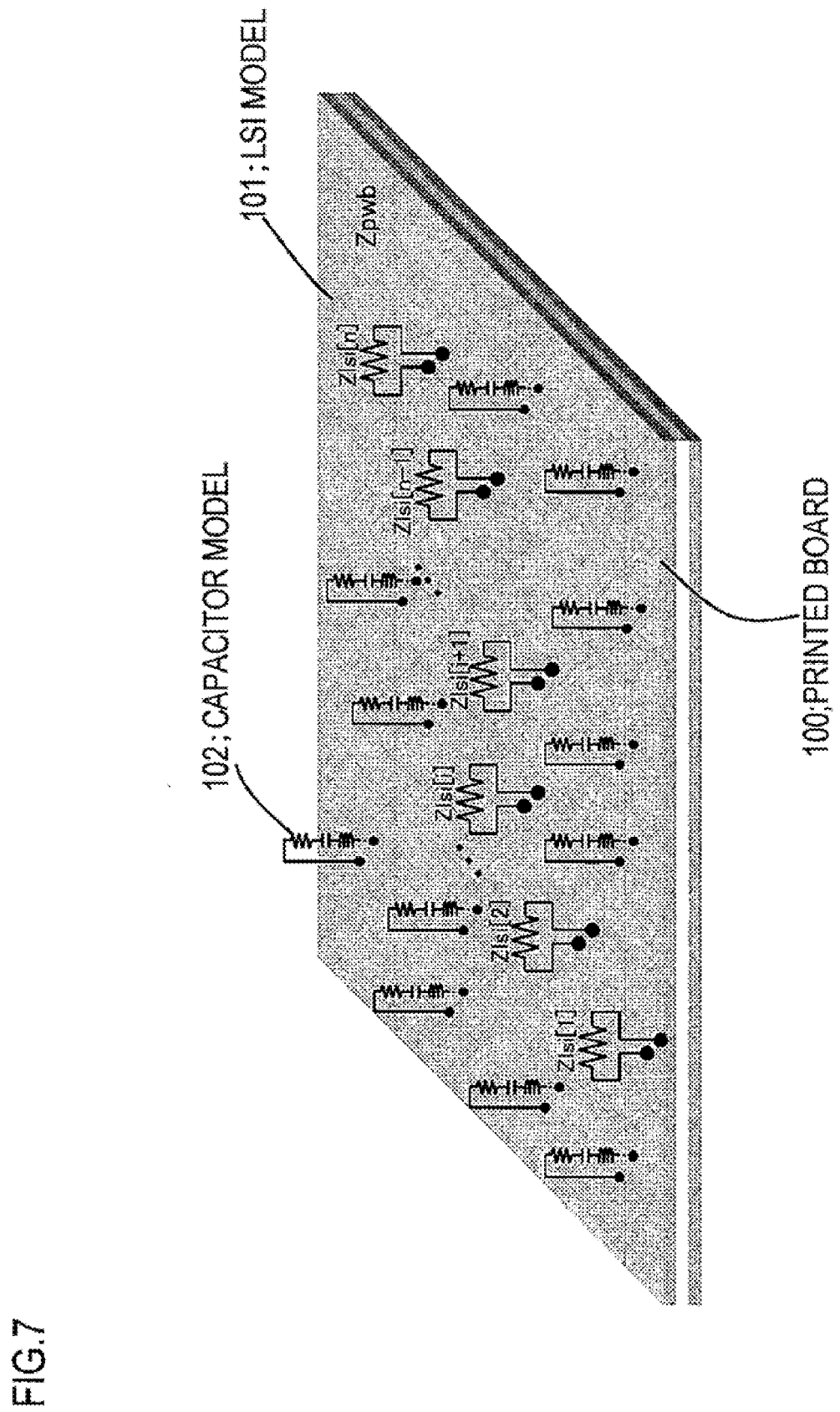
FIG. 7 is a diagram illustrating a model of a printed board.

Next, at step S15 in FIG. 1, a model for analyzing power supply noise is created using the power supply-to-ground impedance characteristic (Z parameter), calculated at step S12 in FIG. 1 and the LSI chip and capacitor impedance characteristics acquired from the differential pair 2. More specifically, as shown for example in FIG. 7, the model for analyzing power supply noise is configured by connecting a capacitor model 102 and an LSI model 101 at respective mounting positions on a board model (model of a printed board) 100.

Next, at step S16 in FIG. 1, power supply noise is analyzed. Analysis of power supply noise will now be described in accordance with a concrete example.

Figure 8:
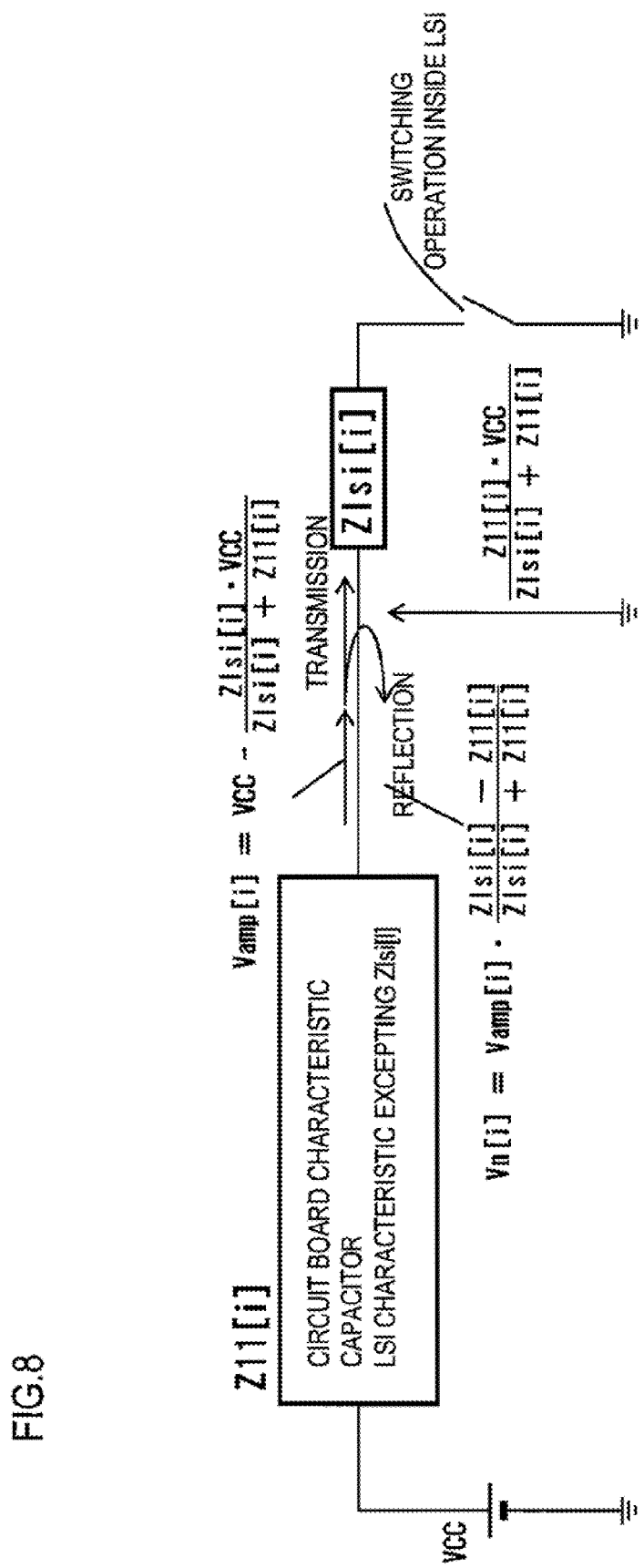
FIG. 8 is a diagram useful in describing analysis of power supply noise in an exemplary embodiment of the present invention.

FIG. 8 is a diagram useful in describing analysis of power supply noise in an exemplary embodiment of the present invention. As shown in FIG. 8, it is assumed that n-number of LSI chips are mounted on an electronic circuit board. An ith (i=1 to n) LSI chip is taken as an LSI chip of interest.

Let $Z1si[i]$ represent the characteristic (input impedance) of the ith LSI chip.

A reflected impedance characteristic (Z11) as seen from the position at which the ith LSI chip is mounted is calculated. This characteristic is that obtained by removing the ith LSI chip from the overall board. Let $Z11[i]$ represent this impedance characteristic.

Since power supply noise is ascribable to a switching operation within the LSI chip (e.g., switching operation between logic 0 and 1 in case of a CMOS LSI chip), it can be regarded as the simple model shown in FIG. 8.

Now, at the boundary (mounting position) of the ith LSI chip and electronic circuit board (printed board),
power supply voltage VCC and
VCC·x $Z11[i]/(Z11[i]+Z1si[i])$, which is a voltage obtained by dividing the power supply voltage VCC by $Z11[i]$ and $Z1si[i]$ are applied to the input of the ith LSI chip as maximum and minimum values, respectively, and a noise voltage the amplitude of which is the difference between these maximum and minimum values is applied to the ith LSI chip from the board.

The amplitude of this noise voltage, which is represented by Vamp[i], is given by the difference between the maximum and minimum values and is represented by Equation (1) below.

$$Vamp[i]=VCC-VCC \cdot x\, Z1si[i]/(Z11[i]+Z1si[i]) \quad (1)$$

In general, the impedances $Z11[i]$ and $Z1si[i]$ are not equal. As a consequence, the effects of reflection and transmission occur.

Specifically, noise Vn[i] that flows from the ith LSI chip to the board is as follows from the equation of reflection:

$$Vn[i]=Vamp[i] \cdot x(Z1si[i]-Z11[i])/(Z1si[i]+Z11[i]) \quad (2)$$

This noise Vn[i] spreads throughout the overall board. It should be noted that Vn[i] in Equation (2) generally is expressed by a complex number comprising a real part and an imaginary part.

By calculating the transmitted impedance from the ith LSI chip to any other LSI chip, the propagation of noise Vn[i] that flows from the ith LSI chip to the board can be calculated.

Noise Vn[i] (i=1 to n) is calculated with regard to noise from the first LSI chip to entire n of the LSI chips mounted on the electronic circuit board, and the sum of these individual noise is computed according to the following equation, based on the principle of superposition:

$$\Sigma Vn[i] \quad (3)$$

whereby the behavior of supply noise propagation through the entire electronic circuit board can be analyzed.

Next, the amount of immunity to power supply noise of each LSI chip is defined, the amount of power supply noise of each analyzed LSI chip is compared with the amount of immunity to power supply noise and whether the design is valid or not is checked (step S17 in FIG. 1). If the result of the comparison is that the amount of power supply noise is unsuitable ("NG" at step S17), then a design change is made in order to reduce the amount of power supply noise (step S18 in FIG. 1).

In general, if the allowable range of the power supply of an LSI chip (the power supply noise margin) is on the order of 5%, application to actual design is fully possible by adopting this margin as the threshold of power supply noise (i.e., as the amount of immunity to power supply noise). By way of example, it may be so arranged that the amount of immunity of an LSI chip to power supply noise is stored in association with the LSI chip in the component database 2 shown in FIG. 1.

Figure 9:
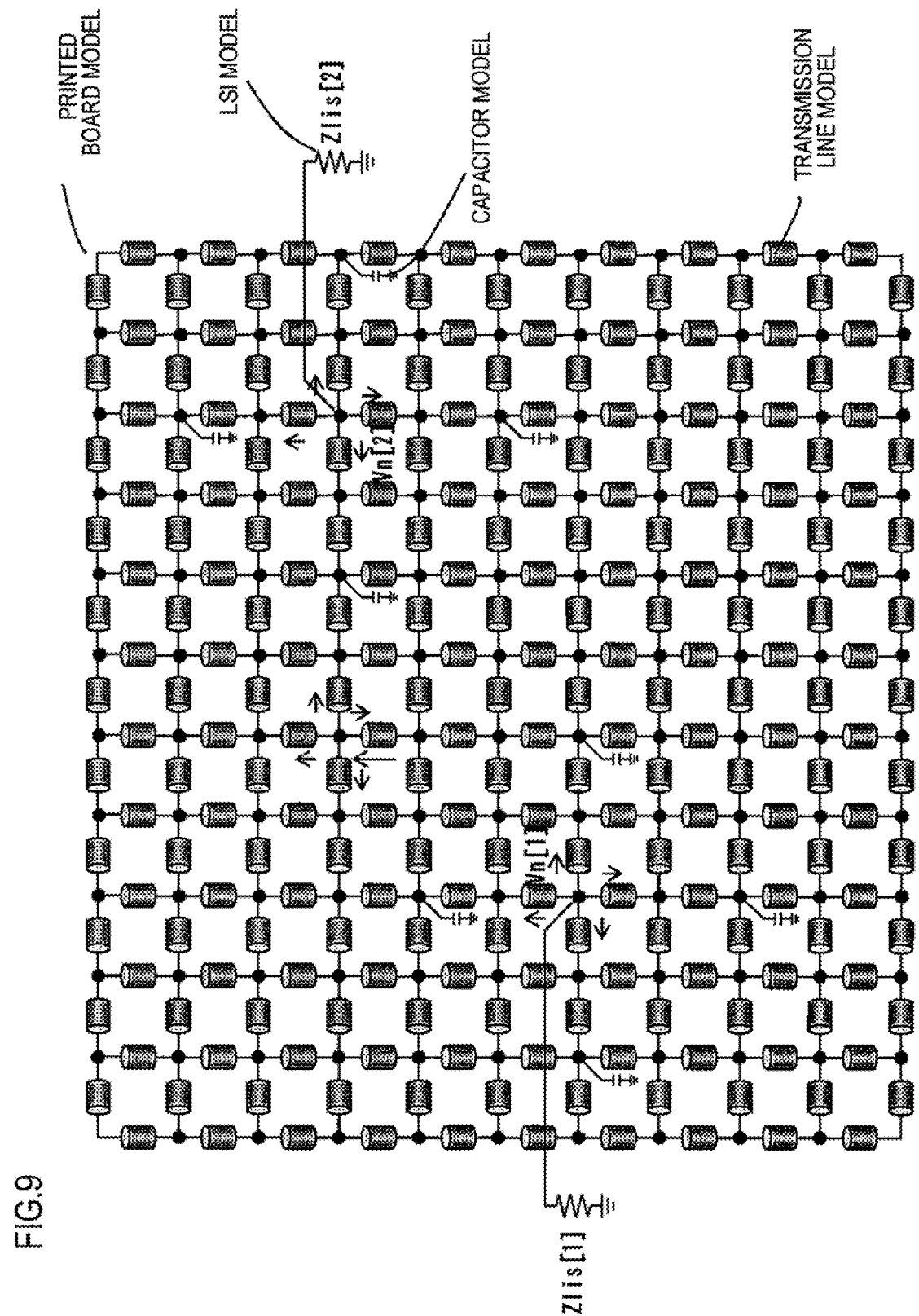
FIG. 9 is a diagram useful in describing a specific example of analysis of power supply noise in an exemplary embodiment of the present invention.

With regard to the analysis of power supply noise at step S16 in FIG. 1, the principle of analysis will be described based on a specific example shown in FIG. 9. FIG. 9 is a model in which two LSI chips and several bypass capacitors are mounted on a printed board. For the sake of convenience, the model of each LSI chip is described as being a pure resistance and the model of each capacitor is described as being a pure capacitance. However, it is assumed that each of these have an impedance characteristic that exhibits a frequency characteristic. Further, an arrangement in which two LSI chips are mounted is adopted in FIG. 9 for the sake of simplicity. In the actual analysis, however, analysis is carried out using characteristic impedance data of the LSI chips and semiconductor electronic components mounted on an electronic circuit board.

As for power supply and ground layers of a printed board, a parallel-plate capacitor of power supply and ground is divided into a mesh structure, as illustrated also in FIGS. 3A to 3C. In the example shown in FIG. 9, the arrangement is such that there is one power supply layer and one ground layer. However, it does not matter if there are a plurality of power supply layers and a plurality of ground layers. In such case it would be required to perform modeling that takes the coupling of these power supply layers and ground layers into consideration.

The models of the LSI chips and capacitors are connected to the mesh-shaped model in conformity with the mounting positions on the electronic circuit board, thereby constructing the analytical model.

Next, a method of analyzing power supply noise using the model shown in FIG. 9 will be described. With regard to a first LSI chip, a reflected wave Vn[1] obtained from FIG. 8 propagates in four directions through the network of transmission lines on the printed board. In the model of FIG. 9, four transmission lines are connected from a single connection point (node) and an amplitude of noise Vn[1]/4 propagates per line.

When noise that propagates through any transmission line meets the next node, reflection and transmission occur.

Since all transmission lines have the same impedance and one transmission line branches into three lines, this is equivalent to the characteristic impedance being connected to one-third of a transmission line.

The amplitude of reflected noise is given as follows:

[amplitude of reflected noise]=[original amplitude]×
(Z0/3−Z0)/(Z0/3+Z0)=−[original amplitude]/2   (4)

The amplitude of transmitted noise per line is given as follows:

[amplitude of transmitted noise per line]=([original
amplitude]−[reflected amplitude])/3=[original
amplitude]/2   (5)

The more propagation advances, the smaller the amplitude becomes.

Further, whenever a reflected wave meets a node, reflection and transmission are repeated and noise propagates through the entire board in such a manner that the repercussions spread throughout. It should be noted that Equations (4) and (5) are for the case of a model where four transmission lines are connected to one node; the equations will be different depending upon the form of the model.

By repeating these calculations, noise produced by the first LSI chip spread throughout the board and the amounts of noise can be calculated.

Next, calculation is performed similarly with regard to a second LSI chip. If three or more LSI chips are mounted, then the calculations are performed with regard to all of the LSI chips.

Next, the sum of the amounts of noise of all LSI chips is taken. This is equivalent to calculating power supply noise that takes all of the LSI chips into consideration in accordance with the principle of superposition. Thus, the mechanism of supply noise generation can be reproduced and power supply noise can be ascertained at the design stage of the printed board.

Further, with regard to the decision on validity of the model regarding power supply noise at step S17 in FIG. 1, the threshold value of power supply noise is stored in the component database 2 comprising the LSI chip information and reference is had to this value, thereby making a precise decision possible. In addition, feedback to design is facilitated.

For an ordinary LSI chip, the specs of the threshold value of power supply noise are the power supply voltage ±5%. Therefore, by adopting this value as a reference value, a database can be created without difficulty.

In a case where an LSI internally incorporates a PLL (Phase-Locked Loop) and the frequency characteristic of power supply noise is required, this can be registered in a separate database, thereby making possible a further improvement in design quality.

In the present invention, a transmission line model (FIG. 3B) and a mesh-structure model (see FIG. 3C) of resistors, capacitors and inductors are described as models of a power supply—ground plane. However, various modeling methods are applicable, examples of which are a finite element method, boundary element method and FDTD (Finite Difference Time Domain) method. There is no particular limitation upon the power supply—ground modeling technique. It is possible to partition a board into m×n portions horizontally and vertically and describe the board as S parameters of Z parameters having (m×n) ports.

The steps S11 to S20 of FIG. 1 naturally may have their functions implemented by a program executed by a data processing apparatus. In such case the means (program modules) of the data processing apparatus (power supply noise analyzing apparatus) that implements the processing of electronic component information extraction, analytical model creation, power supply noise analysis and determination of power supply noise appropriateness at steps S13, S15, S16 and S27, respectively, of FIG. 1 would constitute information extraction means, analytical model creation means, power supply noise analyzing means and means for determining power supply noise appropriateness, respectively (the same hold true for the other steps).

<Comparison with Related Art>

In Patent Document 2, there is disclosed a method in which a semiconductor integrated circuit and a printed board, which are to undergo analysis of power supply noise, are expressed by a power supply network and a current source network, the model of the overall semiconductor integrated circuit and the model of the overall printed board are combined and a circuit equation is solved. Patent Document 2 does not disclose obtaining the reflected voltage of a semiconductor device and is completely different from the present invention, which is configured to calculate power supply noise that flows from a semiconductor device to an electronic circuit board, based on the reflected voltage of the semiconductor device; and, based on the principle of superposition, analyze the power supply noise of the overall electronic circuit board from the power supply noise that flows to the electronic circuit board.

Next, as another exemplary embodiment of the present invention, a description will be given concerning creation of a model of input impedance between power supply and ground of an LSI, making reference to FIG. 10 through FIG. 14

Figure 10:
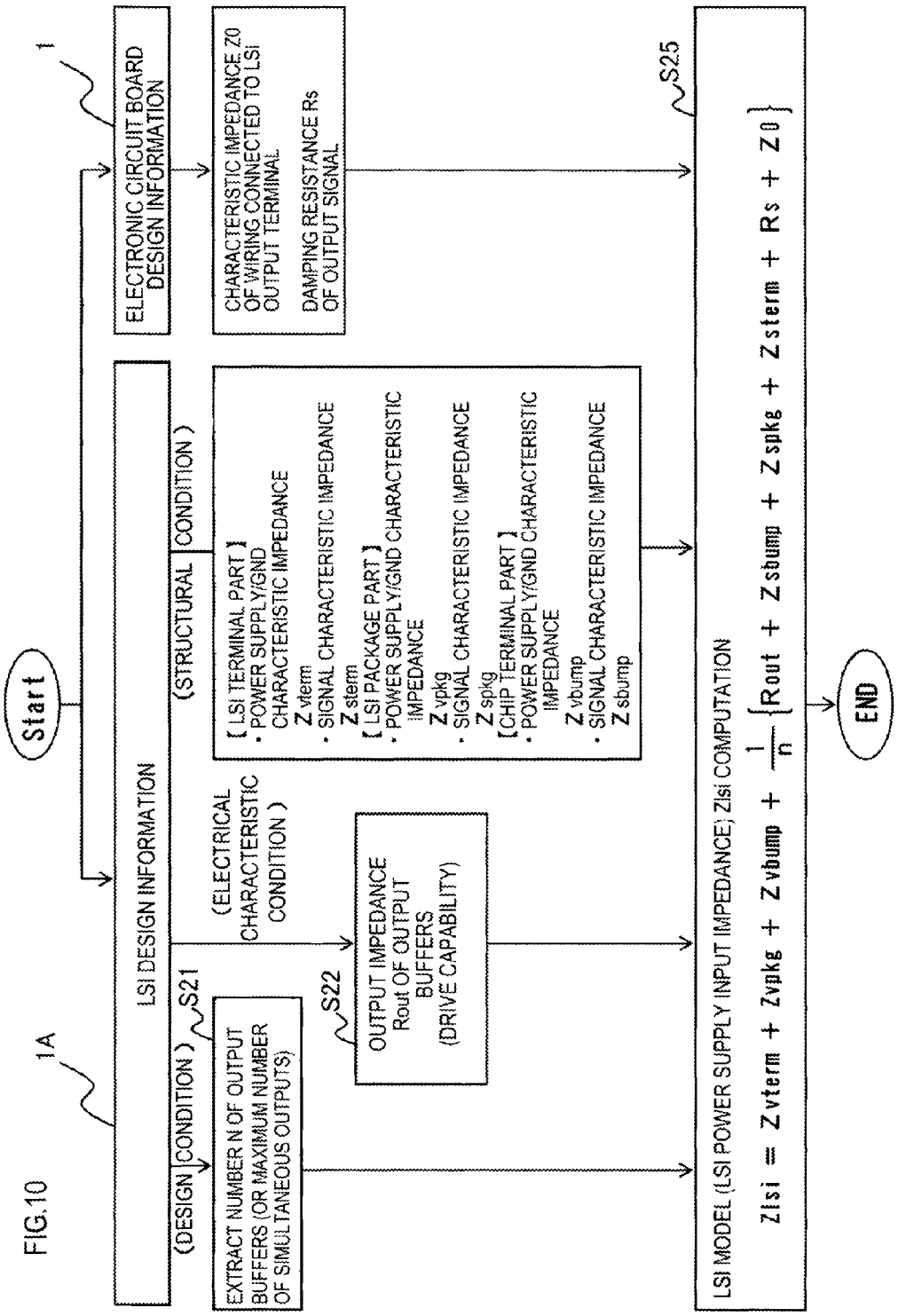
FIG. 10 is a diagram describing a procedure of a second exemplary embodiment of the invention.
Figure 11:
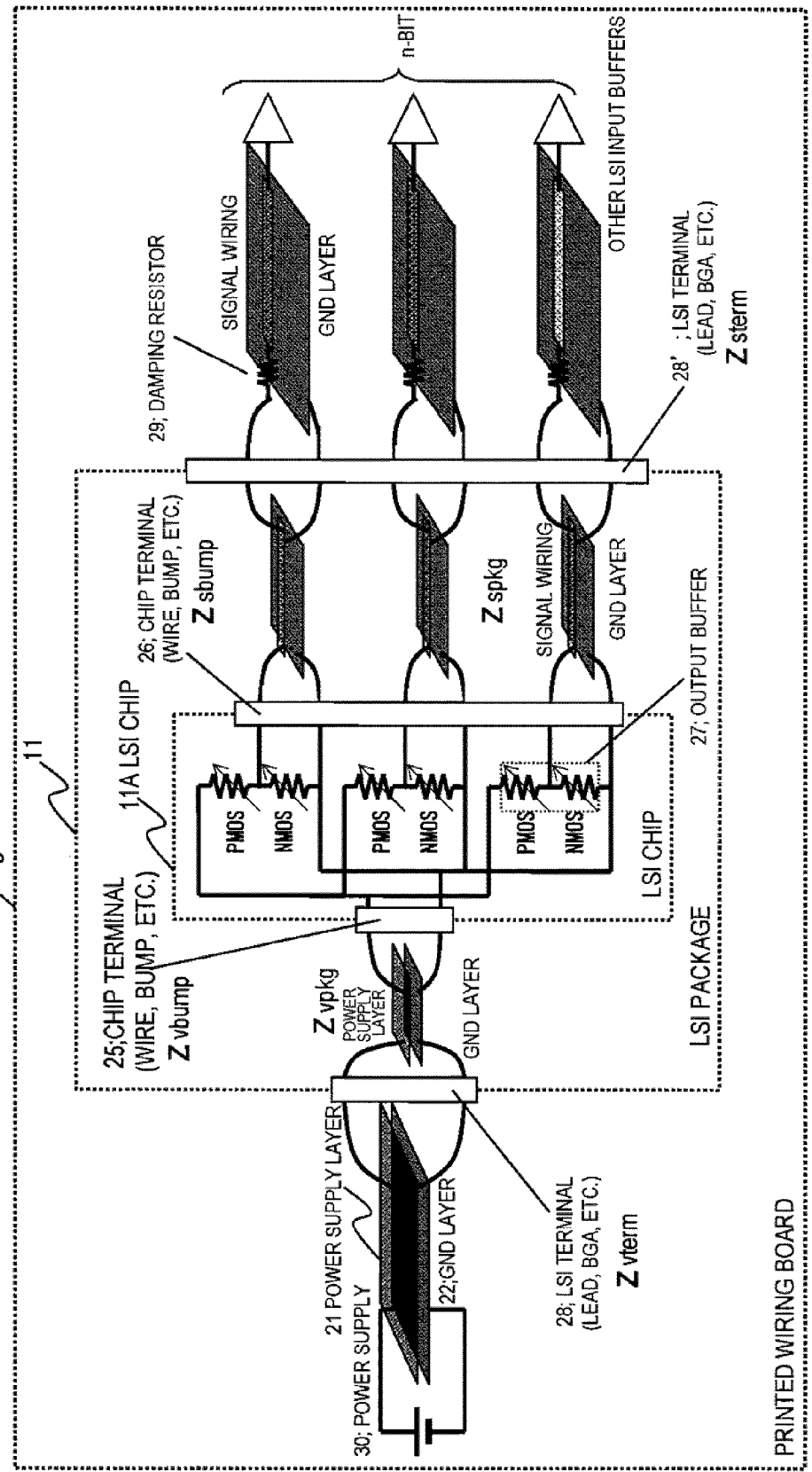
FIG. 11 is a diagram drawing describing the second exemplary embodiment of the invention.

FIG. 10 is a diagram showing a procedure for creating a model of input impedance between the power supply and ground of an I/O power supply of the LSI (where I/O indicates Input/Output for an external interface of the LSI). FIG. 11 is a model of an LSI-mounted board, based on a procedure of FIG. 10. FIG. 11 schematically shows a connection configuration in the printed wiring board (printed board) 10, with regard to a power supply 30, power supply layer 21, ground layer 22, LSI (LSI package) 11, LSI terminal (for example, lead, or BGA (Ball Grid Array)) 28, power supply layer and ground layer in the LSI package, LSI chip 11A, chip terminal 25 (for example, wire or bump), n output buffers 27, chip terminal (for example, wire, or bump) 26, signal wiring/ground layers, LSI terminal (for example, lead or BGA (Ball Grid Array)) 28', and n-bit signal wiring/ground layers.

Figures 12A, 12B:
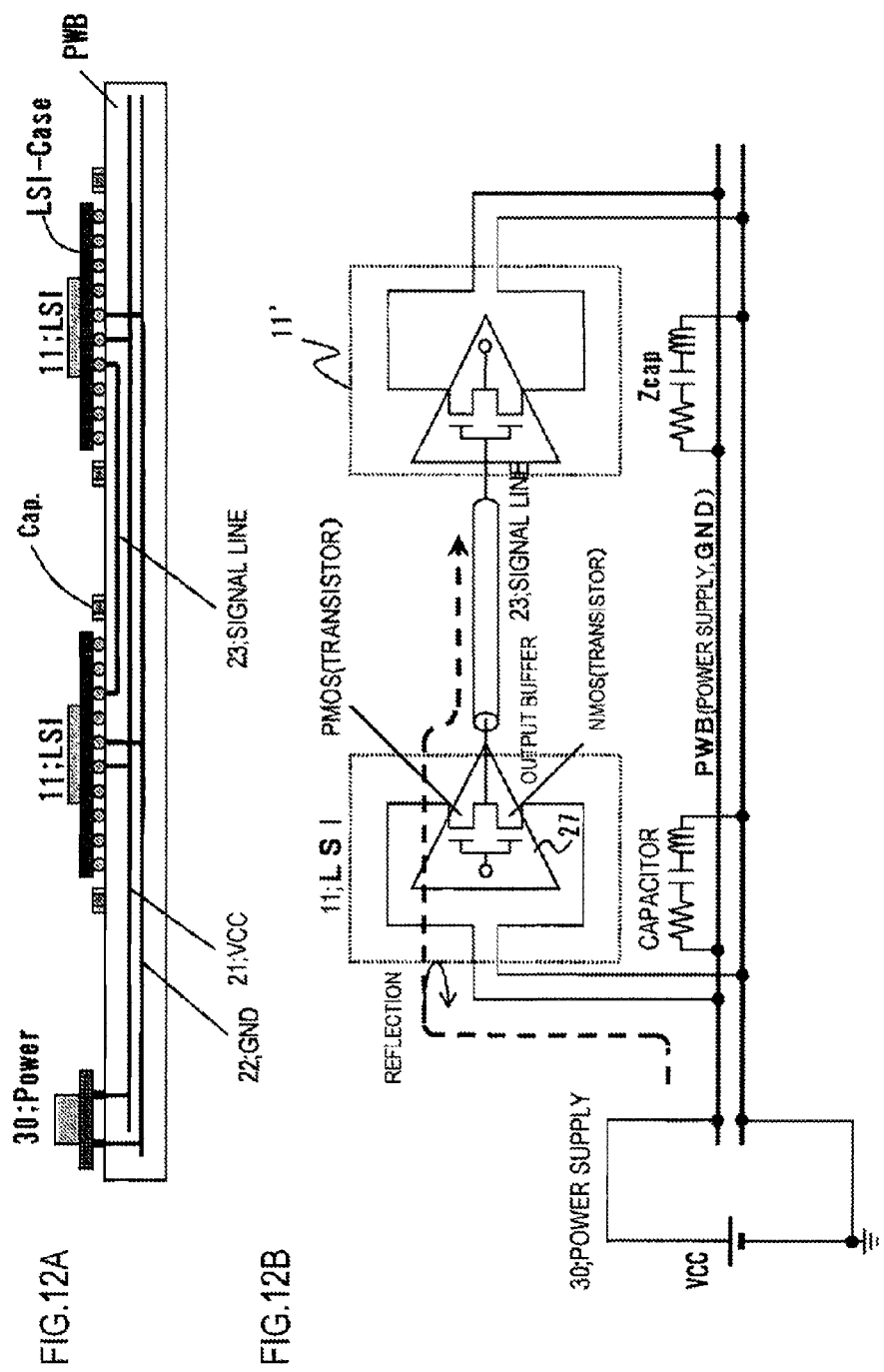
FIGS. 12A and 12B are diagrams illustrating the second exemplary embodiment of the invention.

FIG. 12 is a diagram in which FIG. 11 is simplified and which schematically shows an aspect in which power is supplied to an LSI mounted on the printed wiring board (printed board) 10, and energy thereof flows to a signal line. FIG. 12A shows a side sectional elevation of a configuration of the printed wiring board, and FIG. 12B shows an aspect in which power is supplied from the power supply 30, through the power supply and ground layers of the printed board 10, to the LSI 11, and flows into the signal line 23 from an output buffers 2 of the LSI 11. The power supply and the signal line 23 are connected via transistors (PMOS and NMOS).

Referring to FIG. 10, in the present exemplary embodiment, firstly, the number n of output buffers, each of which has a power supply supplied from the I/O power supply to be analyzed, is extracted from design information (1A) of an IC or LSI, which are semiconductor devices (step S21). In this regard, if the maximum number of simultaneous operations is already known, the maximum number of simultaneous operations may be assumed to be n.

Output impedance is obtained from an output buffer characteristic (step S22).

Although in an example shown in FIG. 12B, there is illustrated an output buffer model of the LSI including a CMOS inverter composed by a PMOS transistor and an NMOS transistor, the basic concept does not change even with other circuits.

Figure 13A:
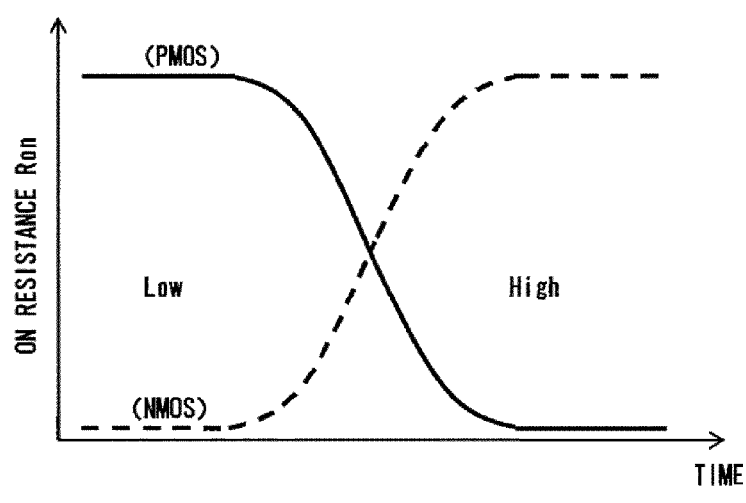
FIGS. 13A, 13B and 13C are diagrams describing a CMOS output buffer.
Figure 13B:
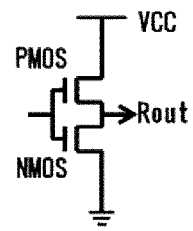

With regard to the CMOS inverter composing the output buffer 27, as shown in FIG. 13B, the PMOS transistor and the NMOS transistor have sources connected to the power supply VCC and to ground, respectively, have drains connected in common to an output terminal, and have gates connected in common for receiving an input signal.

Figure 13C:
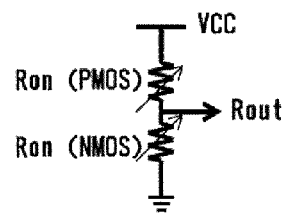

The PMOS and NMOS transistors in FIG. 13B can be represented by variable resistors, as shown in FIG. 13C.

FIG. 13A is a diagram showing temporal variation of impedance characteristic of the PMOS and NMOS transistors of the output buffer of FIG. 13B. That is, FIG. 13A shows an aspect of change of output impedance (ON resistances Ron) of the PMOS and NMOS transistors of FIG. 13C when gate voltage of the PMOS and NMOS transistors changes with the elapse of time. As shown in FIG. 13A, ON resistances Ron (PMOS) and Ron(NMOS) of the PMOS and NMOS vary complementarily.

It is clear from Thevenin's theorem that output impedance Rout of the output buffer is a combined resistance of the ON resistances Ron (PMOS) and Ron (NMOS) of the PMOS and NMOS.

$$Rout=\{Ron(PMOS)\times Ron(NMOS)\}/\{Ron(PMOS)+Ron(NMOS)\} \quad (6)$$

Short circuit current which is generally discussed with regard to power supply noise or current consumption is current flowing from the power supply VCC to ground, with both Ron(PMOS) and Ron(NMOS) ON at the same time. It should be noted that short circuit current can be explained by behavior of the complementarily varying resistances, so that this output impedance Ron defined in the expression (6) is said to take short circuit current into account.

A method for deriving the output impedance of an output buffer will be described. The output impedance can be derived from current-to-voltage characteristic of the output impedance, as shown in FIG. 14. A graph (horizontal axis: current, vertical axis: voltage) of FIG. 14 shows a plurality of plots superimposing a High level characteristic and a Low level characteristic of the output buffer, and in addition corresponding with driving capability of the output buffer (4 mA, 6 mA, 8 mA, 12 mA, and 24 mA). A load curve should be described by plotting a characteristic of an input buffer, but since a description is possible with only the output buffer characteristic, it is omitted.

A load curve of characteristic impedance of wiring is plotted with an initial stable point at current of 0 A and 0V as a Low→High load curve in case of an output voltage of the output buffer changing from a Low level to a High level. An intersection point of the Low→High load curve and a High characteristic curve correspond to current and voltage with which the output buffer drives a signal wiring.

FIG. 14 shows a curve of driving capability 12 mA of the output buffer. At this intersection point, shown as a point surrounded by a circle in FIG. 14, a slope of a tangent line of the current-to-voltage characteristic curve (absolute value of the slope at the intersection point) is equivalent to the output impedance Rout. In this way, the output impedance of the output buffer can be easily derived.

Referring to FIG. 10 once again, respective impedance characteristics are extracted for power supply-ground and signal of an LSI terminal, LSI package, bonding wire, bump, and the like, that make up the LSI.

It is assumed that respective characteristic impedances of power supply/ground and signal of the LSI terminal part are Zvterm and Zsterm;

respective characteristic impedances of power supply/ground and signal of the LSI package part are Zvpkg and Zspkg; and respective characteristic impedances of power supply/ground and signal of the chip terminal part are Zvbump and Zsbump.

Since the influence of these impedances is small in comparison to the output impedance Rout and the printed board characteristic which is described later, power supply noise analysis can dispense with information of these characteristic impedances, if high accuracy of the power supply noise analysis is not necessarily demanded.

Referring to FIG. 10, the characteristic impedance Z0 of a wiring pattern connected to a terminal of the output buffer is extracted from the electronic circuit design information 1. In this regard, if a series resistor (damping resistor) is connected in the wiring pattern, a resistance value Rs thereof is extracted (step S25).

When the characteristic impedance Z0 of a wiring pattern is extracted, the input impedance between the power supply and ground of the LSI is calculated by the following Equation (7).

$$Z1si=Zvterm+Zvpkg+Zvbump+\{Rout+Zsbump+Zspkg+Zsterm+Rs+Z0\}/n \quad (7)$$

If Zvterm, Zsterm, Zvpkg, Zspkg, Zvbump, and Zsbump are omitted in Equation (7), we have $$Z1si=\{Rout+Rs+Z0\}/n \quad (8)$$

Equation (8) makes up one of features of the present invention. That is, the input impedance $Z1si$ between the power supply and ground of the LSI is equal to the sum of the output impedance Rout of a signal output, the characteristic impedance Z0 of the wiring, and the damping resistance Rs, divided by the number of signal lines.

The same output impedance and the same wiring characteristic impedance and damping resistance are assumed in Equation (8). In case of different values of resistance or impedance, a calculation of a combined resistance is employed. That is, a resistance value R is calculated by the following Equation.

$$1/R=1/R1+1/R2+\ldots+1/Rn \quad (9)$$

Even if respective output impedances Rout have different values, wiring characteristic Z0 have different values, and damping resistance Rs have different values, it is possible to derive the input impedance $Z1si$ between the power supply and ground of the LSI.

An operation principle of the input impedance between the power supply and ground of the LSI will be described. As described above, in FIG. 12, the PMOS and NMOS transistors of the output buffer 27 are represented by complementary variable resistors as shown in FIG. 13C.

The power supply and ground of the printed board can also be regarded as one transmission route, and the signal wiring and the power supply and ground of the printed board are regarded as being connected via a resistor. A reflection and transmission relationship between the signal wiring and the power supply-ground of the printed board holds. From this, the input impedance between the power supply and ground of the LSI is the sum of the impedance of the signal wiring and the output impedance of the output buffer and, if n output buffers with the same characteristic are connected, can be understood to be 1/n thereof.

In addition, in cases of different types of output buffers, impedance is obtained by computation of combined resistances of Equation (9). However, wiring and terminal of an interposer (LSI package), wiring to chip (or bump) and the like, inside the LSI are factors determining the impedance. These are shown in FIG. 11.

A method for power supply noise analysis according to the present exemplary embodiment will be described with reference to FIG. 9. With regard to the first LSI, the reflected wave Vn[1] obtained from FIG. 8 is propagated in four directions in a transmission line network on the printed board. In the model of FIG. 9, four transmission lines are connected in common to one connection point (node), and for each transmission line, an amplitude of Vn[1]/4 is propagated.

If noise propagating through an arbitrary transmission line collides with a subsequent connection point (node), a reflection/transmission phenomenon occurs. With all the transmission lines having the same impedance, since one transmission line branches into three, the characteristic impedance is equivalent to being connected to ⅓ of the transmission line. Accordingly, we have

[amplitude of reflected noise]=[original amplitude]×
  (Z0/3−Z0)/(Z0/3+Z0)=−[original amplitude]/2    (10)

[amplitude of transmitted noise per line]=(1−[reflected amplitude])/3=[original amplitude]/2    (11)

Thus, as propagation of noise progresses in the transmission line network, the amplitude of the noise decreases.

Every time reflection collides with a connection point, the reflection/transmission is repeated, and overall, the noise is propagated to the whole of the circuit board, like a wave pattern spreading out. The above Equations (10) and (11) are cases of a model in which four transmission lines are connected in common to one node. The equations differ according to the form of the model. By repetition of this type of computation, noise generated by the LSI 1 spreads out to the whole of the printed board, and it is possible to calculate respective noise amounts.

Next, a similar computation is made with regard to a second LSI, and if three or more LSIs are mounted on the printed board, the computation is performed for all the LSIs. Finally, by taking the sum of noise amounts of all the LSIs mounted on the printed board, this is equivalent to calculating the power supply noise giving consideration to all the LSIs, from the principle of superposition.

In this way, a mechanism of power supply noise generation can be reproduced, and there is an advantage in that it is possible to grasp power supply noise of a printed board at the design stage thereof.

In the flow relating to decision of the validity of the power supply noise (step S17) in FIG. 1, the threshold of the power supply noise is recorded in the LSI database, and by referring to a value thereof, it becomes possible to make a appropriate decision, and it is apparent that feedback to design is facilitated. As described above, in general in the LSI, since the power supply voltage specification is approximately ±5%, if this value is made a reference value, creation of the database is no longer troublesome. In case wherein there is a PLL or the like provided in the LSI and a frequency characteristic of the power supply noise is required, by individually recording the frequency characteristic in the database, it is possible to further improve design quality. According to the present embodiment, the inside of an LSI is not assumed to be a black box, so that there is an advantage in that it is possible to obtain the input impedance between the power supply and ground of an LSI from information that can be obtained rather easily such as the output impedance of an output buffer and the impedance of wiring.

Figure 15:
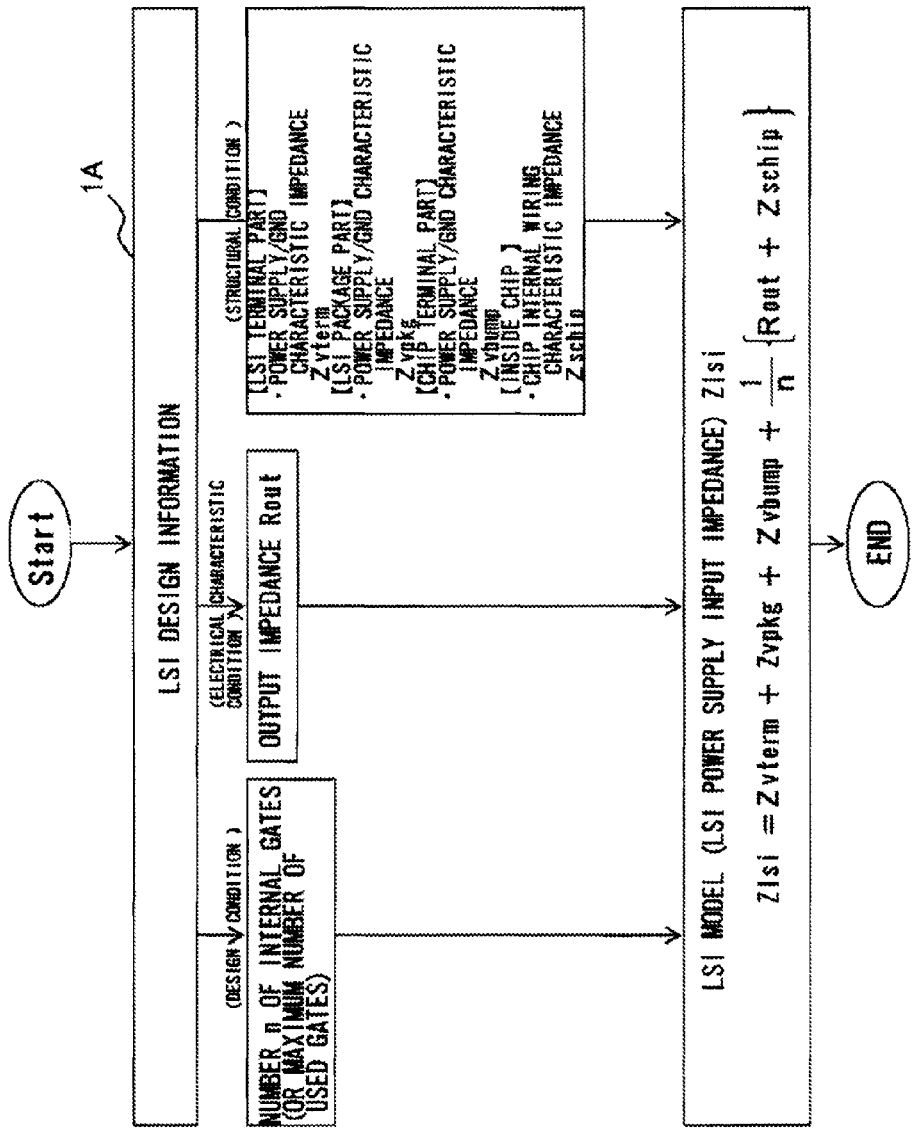
FIG. 15 is a diagram describing a procedure of the second exemplary embodiment of the invention.
Figure 16:
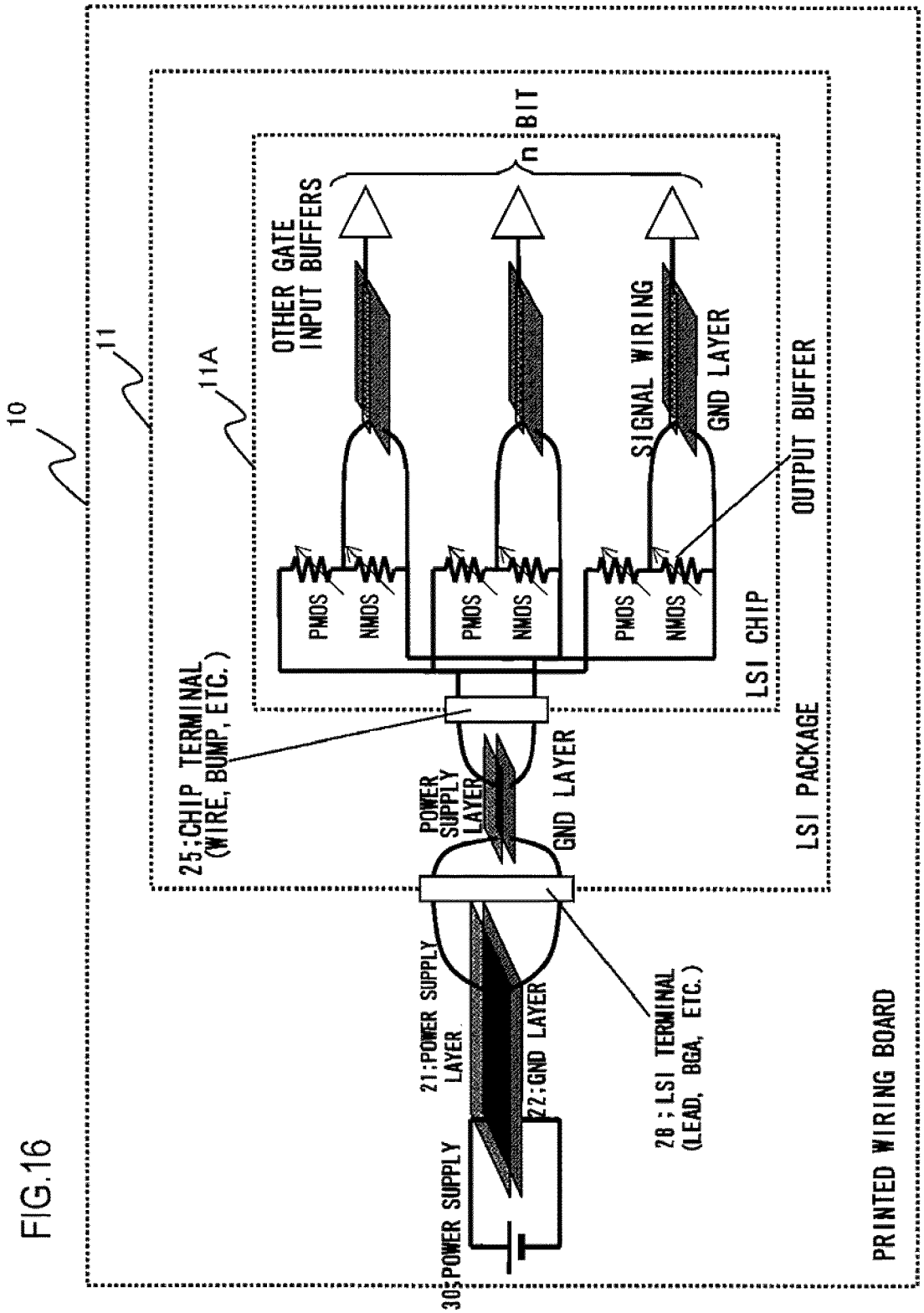
FIG. 16 is a diagram describing the second exemplary embodiment of the invention.

As a method of obtaining the input impedance between the power supply and ground of the LSI, FIG. 15 shows flow and a configuration of a core power supply (power supply for internal circuit). FIG. 16 is a diagram schematically showing an internal configuration (provided with n-bit equivalent output buffers) of an LSI chip mounted on the printed board 10.

As for an internal circuit of an LSI chip, the number of internal output gates within the LSI chip and characteristic impedance of the chip internal wiring (for example, aluminum wiring) are necessary. The principle or fundamental concept is the same as the abovementioned exemplary embodiment.

From the LSI design information 1A, it is assumed that the number of internal output gates inside the chip is n;
 the output impedance is Rout;
 the characteristic impedances of the power supply/ground of the LSI terminal part is Zvterm;
 the characteristic impedance of the power supply/ground of the LSI package part is Zvpkg;
 the characteristic impedance of the power supply/ground of a chip terminal part is Zsbump; and
 the characteristic impedance of the chip internal wiring (for example, aluminum wiring) is Zschip, it is possible to calculate the input impedance between the power supply and ground of the LSI by the following Equation (12).

$Z1si=Zvterm+Zvpkg+Zvbump+\{Rout+Zschip\}/n$    (12)

Modifications and adjustments of exemplary embodiments and examples are possible within the bounds of the entire disclosure (including the scope of the claims) of the present invention, and also based on fundamental technological concepts thereof. Furthermore, a wide variety of combinations and selections of various disclosed elements are possible within the scope of the claims of the present invention. That is, the present invention clearly includes every type of transformation and modification that a person skilled in the art can realize according to technological concepts and the entire disclosure including the scope of the claims.

What is claimed is:

1. An apparatus for analyzing power supply noise of an electronic circuit board, the apparatus comprising:
    a section that calculates a reflected voltage of power supply noise at a semiconductor device mounted on the electronic circuit board, based on an impedance characteristic between a power supply and ground of the semiconductor device;
    a section that analyzes the power supply noise of the electronic circuit board, based on the reflected voltage of power supply noise at the semiconductor device;
    a section that refers to design information of the semiconductor device mounted on the electronic circuit board, the design information of the semiconductor device being stored in a recording medium;
    a section that derives an input impedance between the power supply and ground of the semiconductor device, based on number of internal gates of the semiconductor device, output impedance, impedance characteristic between power supply and ground of each of a semiconductor device terminal, a package, and a chip terminal part, and impedance characteristic of wiring in a chip;
    a section that extracts power supply and ground information and electronic component information inclusive of at least a capacitor and the semiconductor device connected to the power supply and ground from design information of the electronic circuit board, wherein the information of each electronic component is associated with a corresponding impedance characteristic of the electronic component;

a section that creates an analytical model of power supply noise by connecting a model of the associated impedance characteristic of each extracted electronic component to a mounting position on a board model of the electronic circuit board;

a section that calculates propagation of power supply noise flowing from the semiconductor device to the electronic circuit board in the analytical model of power supply noise; and a section that analyzes behavior of propagation of power supply noise in the electronic circuit board, based on power supply noise of the semiconductor device mounted on the electronic circuit board.

2. A program embodied in a non-transitory computer-readable medium for causing a computer to execute the following processing, comprising:

calculating a reflected voltage of power supply noise at a semiconductor device mounted on an electronic circuit board, based on an impedance characteristic between a power supply and ground of the semiconductor device;

analyzing power supply noise of the electronic circuit board, based on the reflected voltage of the power supply noise at the semiconductor device;

referring to design information of the semiconductor device mounted on the electronic circuit board, the design information of the semiconductor device being stored in a recording medium;

deriving an input impedance between the power supply and ground of the semiconductor device, based on number of internal gates of the semiconductor device, output impedance, impedance characteristic between power supply and ground of each of a semiconductor device terminal, a package, and a chip terminal part, and impedance characteristic of wiring in a chip;

extracting power supply and ground information and electronic component information inclusive of at least a capacitor and the semiconductor device connected to the power supply and ground from design information of the electronic circuit board, wherein the information of each electronic component is associated with a corresponding impedance characteristic of the electronic component;

creating an analytical model of power supply noise by connecting a model of the associated impedance characteristic of each extracted electronic component to a mounting position on a board model of the electronic circuit board;

calculating propagation of power supply noise flowing from the semiconductor device to the electronic circuit board in the analytical model of power supply noise; and analyzing behavior of propagation of power supply noise in the electronic circuit board, based on power supply noise of the semiconductor device mounted on the electronic circuit board.

* * * * *